United States Patent
Izumi et al.

(10) Patent No.: US 11,359,539 B2
(45) Date of Patent: Jun. 14, 2022

(54) ACTUATOR AND EXHAUST VALVE DRIVING DEVICE

(71) Applicants: Jeco Co., Ltd., Saitama (JP); TOYOTA JIDOSHA KABUSHIKI KAISHA, Aichi (JP)

(72) Inventors: Hikoshi Izumi, Saitama (JP); Yoshiyuki Ariki, Saitama (JP); Taiki Miyokawa, Saitama (JP); Yuta Muneyoshi, Saitama (JP); Tomoki Mabuchi, Aichi (JP)

(73) Assignees: Jeco Co., Ltd., Saitama (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 122 days.

(21) Appl. No.: 16/916,598

(22) Filed: Jun. 30, 2020

(65) Prior Publication Data

US 2021/0071568 A1 Mar. 11, 2021

(30) Foreign Application Priority Data

Sep. 6, 2019 (JP) .............................. JP2019-163096

(51) Int. Cl.
*F16K 31/04* (2006.01)
*F02M 26/26* (2016.01)
*F02B 37/18* (2006.01)

(52) U.S. Cl.
CPC ........... *F02B 37/186* (2013.01); *F02M 26/26* (2016.02); *F16K 31/042* (2013.01)

(58) Field of Classification Search
CPC .............................. F16K 31/042; F02M 26/26
USPC ........................................ 251/129.11, 129.12
See application file for complete search history.

(56) References Cited

U.S. PATENT DOCUMENTS

| | | | | |
|---|---|---|---|---|
| 4,235,213 A | * | 11/1980 | Jellissen | F02P 7/07 123/146.5 A |
| 4,892,286 A | * | 1/1990 | Reinicke | G05D 16/202 251/129.05 |
| 5,083,744 A | * | 1/1992 | Oliver | F16K 31/041 137/486 |
| 5,237,272 A | * | 8/1993 | Murata | G01D 5/147 123/146.5 A |
| 5,325,005 A | * | 6/1994 | Denk | H02K 29/08 310/256 |
| 6,067,824 A | * | 5/2000 | Osborne | B60R 25/04 70/252 |

(Continued)

FOREIGN PATENT DOCUMENTS

CN 103161582 6/2013
DE 10023695 6/2001

(Continued)

*Primary Examiner* — Seth W. Mackay-Smith
(74) *Attorney, Agent, or Firm* — IPUSA, PLLC

(57) ABSTRACT

An actuator 1 includes a housing 2, an output shaft 3 projecting from the inside of the housing 2 to the outside, a motor 4 provided in the housing 2, a reduction mechanism 5 which connects the motor 4 to the output shaft 3, a magnet 61 provided for rotation integrally with the output shaft 3 inside the housing 2, a Hall effect IC 62 disposed to face the magnet 61 outside the rotation locus of the magnet 61, and a circumferential wall 25 disposed to stand from the inner wall of the housing 2 and interposed between the magnet 61 and the Hall effect IC 62.

3 Claims, 6 Drawing Sheets

(56) References Cited

U.S. PATENT DOCUMENTS

| | | | | |
|---|---|---|---|---|
| 6,300,739 | B1 * | 10/2001 | Ratliff | H02K 5/225 |
| | | | | 318/437 |
| 6,443,135 | B1 * | 9/2002 | Dismon | F02M 35/10222 |
| | | | | 123/568.18 |
| 6,497,035 | B1 * | 12/2002 | Ratliff | G01B 7/003 |
| | | | | 174/117 F |
| 6,729,299 | B2 * | 5/2004 | Anschicks | F02D 9/1065 |
| | | | | 123/361 |
| 7,882,852 | B2 * | 2/2011 | Coakley | G01D 5/145 |
| | | | | 137/552 |
| 8,720,851 | B2 * | 5/2014 | Furukawa | F02M 26/54 |
| | | | | 251/129.04 |
| 2001/0002599 | A1 | 6/2001 | Apel et al. | |
| 2004/0100252 | A1 * | 5/2004 | Babin | G01D 5/2515 |
| | | | | 324/207.25 |
| 2005/0236219 | A1 | 10/2005 | Saito et al. | |
| 2013/0146003 | A1 | 6/2013 | Baek et al. | |

FOREIGN PATENT DOCUMENTS

| | | |
|---|---|---|
| JP | 2019-082358 | 5/2019 |
| KR | 10-2013-0034685 | 4/2013 |

\* cited by examiner

ACTUATOR AND EXHAUST VALVE DRIVING DEVICE

CROSS-REFERENCE TO RELATED APPLICATIONS

The present application claims priority under 35 U.S.C. § 119 to Japanese Patent Application No. 2019-163096, filed Sep. 6, 2019, the contents of which are incorporated herein by reference in their entirety.

TECHNICAL FIELD

The present disclosure relates to an actuator and exhaust valve driving device.

BACKGROUND ART

Conventionally, as a structure for detecting the rotational amount of a rotation shaft, a method of detecting the magnetic flux density of a magnet installed to rotate integrally with the rotation shaft by a Hall effect IC mounted on a circuit board and calculating the rotational amount based on the variation of the detected flux density is known (for example, Patent Document 1).

BACKGROUND ART DOCUMENT

Patent Document 1

Japanese Patent Application Publication No. 2019-82358

SUMMARY OF INVENTION

Problem to be Solved by the Invention

However, there is a space between the Hall effect IC and the magnet, and when iron-based foreign material enters this space, the output voltage from the Hall effect IC has an abnormal value.

The present disclosure has an object to provide an actuator and an exhaust valve driving device which is suitably capable of preventing foreign material from entering and maintaining a highly accurate detection of the rotational amount.

Means for Solving Problem

An actuator according to one aspect of an embodiment of the present invention includes a housing, an output shaft provided to protrude from an inside of the housing to an outside of the housing, a power source, which is provided inside the housing, a reduction mechanism, with which the power source and the output shaft are connected, a magnet, which is provided inside the housing so as to rotate integrally with the output shaft, a Hall element, which is disposed to face the magnet on an outside of a rotation locus of the magnet, and a circumferential wall, which is disposed to stand from an inner wall of the housing and is interposed between the magnet and the Hall element.

Similarly, an exhaust valve driving device according to another aspect of an embodiment of the present invention includes the actuator described above and an exhaust valve connected to the output shaft and provided in an exhaust passage of an internal combustion engine.

Effect of the Invention

In accordance with the present disclosure, there are provided an actuator and exhaust valve driving device capable of maintaining high-precision rotational volume detection can be provided.

MODE OF CARRYING OUT THE INVENTION

Figure 1:
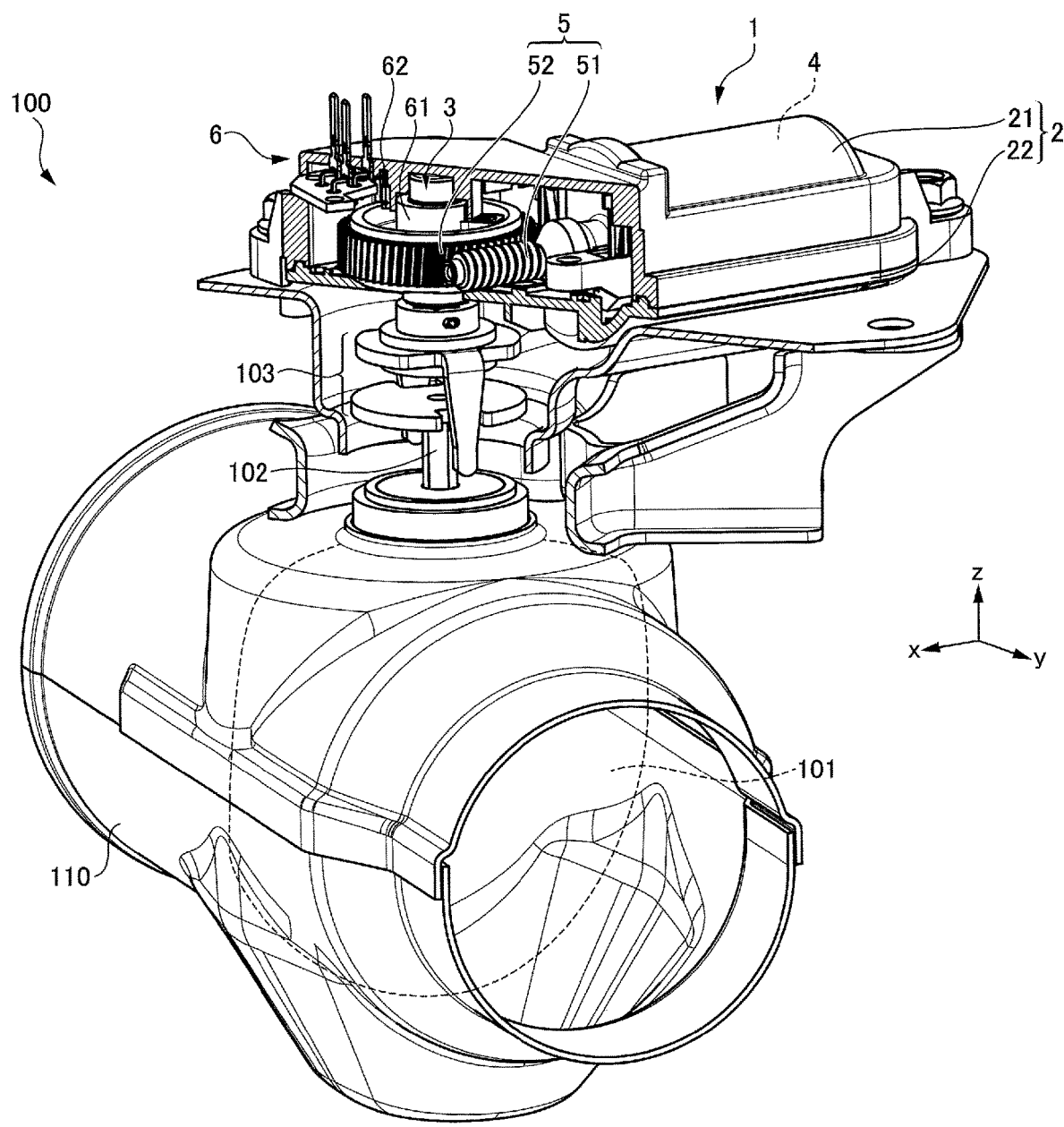
FIG. 1 is a perspective view of an exhaust valve driving device unit.

Hereinafter, embodiments will be described with reference to the accompanying drawings. In order to facilitate understanding of the description, the same elements in each drawing are, as far as possible, designated by the same reference numerals, and an overlapping description is omitted.

In the following description, the x direction, y direction, and z direction are perpendicular to each other. The x and y directions are typically horizontal directions, and the z direction is typically a vertical direction. For the purpose of illustration, the z positive direction side may be referred to as an upper side, and the z negative direction side may be referred to as a lower side.

First, the exhaust valve driving device 100, to which the actuator 1 in accordance with the present embodiment is applied, will be described with reference to FIG. 1. FIG. 1 is a perspective view of an exhaust valve driving device 100. In FIG. 1, a portion of a housing on the front side of the paper surface is excluded to facilitate visualization of the internal structure of the exhaust valve driving device 100, and the boundary with the excluded portion is illustrated in cross-section.

The exhaust valve driving device 100 is a device that opens and closes an exhaust valve 101 provided in an exhaust passage 110 of an engine (internal combustion engine) to switch the exhaust passage such as switching a plurality of exhaust pipes or switching a collective mode in the case of a collective pipe. Thus, for example, the exhaust efficiency of an automobile and the charging efficiency of fresh air can be improved, and the exhaust note of the muffler can be adjusted.

As illustrated in FIG. 1, the exhaust valve driving device 100 includes an exhaust valve 101, a rotation shaft 102 connected to the exhaust valve 101, and an actuator 1 for rotating the rotation shaft 102. The rotation shaft 102 of the exhaust valve 101 and the output shaft 3 of the actuator 1 are connected by a pair of connecting members 103, for example, illustrated in FIG. 1, so that the rotation of the output shaft 3 of the actuator 1 is transmitted to the exhaust valve 101.

In FIG. 1, the exhaust valve driving device 100 is disposed on the upper side (the z positive direction side) of the exhaust passage 110 of the engine, and a structure in which the rotation shaft 102 and the output shaft 3 are disposed in the z direction being the axial direction is illustrated. However, the arrangement of the exhaust valve driving device 100 is not limited thereto.

Figure 2:
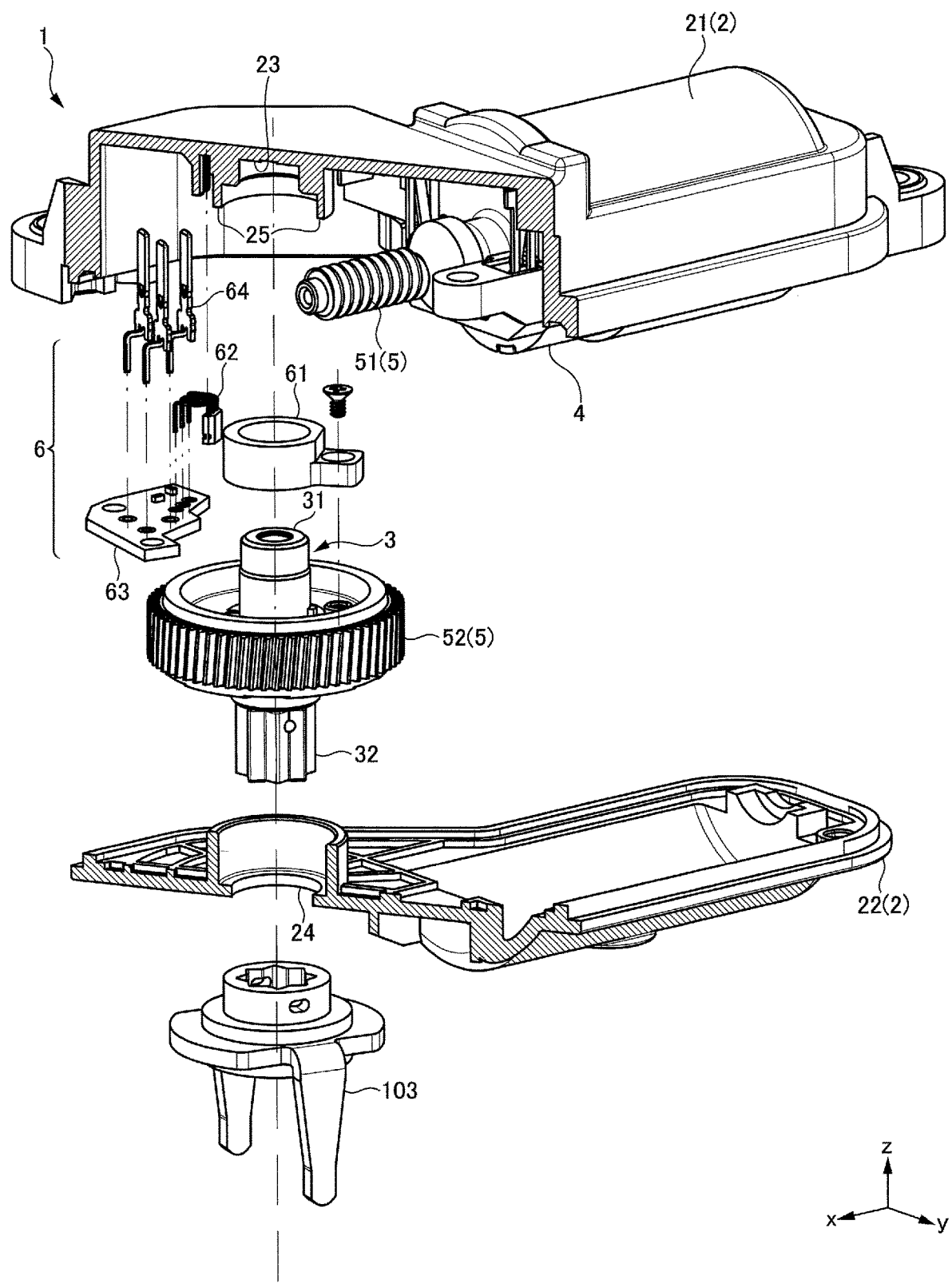
FIG. 2 is an exploded perspective view of the actuator in FIG. 2.

Referring to FIG. 2 in addition to FIG. 1, the structure of the actuator 1 will be described.

FIG. 2 is an exploded perspective view of the actuator 1 in FIG. 1. In a manner similar to FIG. 1, in order to make the internal structure of the actuator 1 easier to be seen, a portion of the housing on the front side of the paper surface is excluded, and the boundary between the excluded portion and the housing is illustrated in cross-section.

The actuator 1 transmits the driving force of the motor 4 to the output shaft 3 through the reduction mechanism 5 and rotates the output shaft 3, thereby outputting the driving force from the output shaft 3 to a driven portion (in the present embodiment, the exhaust valve 101). As illustrated in FIGS. 1 and 2, the actuator 1 includes the housing 2, the output shaft 3, the motor 4 (a driving source), the reduction mechanism 5, and the tachometer side portion 6.

The housing 2 is made with an upper case 21 and a lower case 22, which are disposed opposite to an axial direction (the z direction) of the output shaft 3. In the example of FIGS. 1 and 2, the upper case 21 is disposed in the z positive direction side and the lower case 22 is disposed in the z negative direction side. The upper case 21 and the lower case 22 are made from, for example, resin material. The upper case 21 and the lower case 22 are joined while interposing a gasket or the like for waterproofing, and the motor 4, the reduction mechanism 5, and a part of the output shaft 3 are accommodated therein.

The motor 4 and the output shaft 3 are connected by the reduction mechanism 5 to transmit power. In this embodiment, the reduction mechanism 5 is a worm gear structured such that a worm 51 (a screw gear) provided in the drive shaft of the motor 4 and a worm wheel 52 (a helical gear) provided integrally with the output shaft 3 are engaged so that the directions of the rotation shafts of the worm gear and the worm wheel 52 is perpendicularly cross each other. In the example of FIGS. 1 and 2, the motor 4 is arranged so that the drive shaft extends in the x direction, whereby the worm 51 rotates around the rotation shaft along the x direction.

The rotation center of the worm wheel 52 is the axis center of the output shaft 3 and is formed concentrically on the outer side in the radial direction of the output shaft 3. That is, the worm wheel 52 rotates around the rotation shaft extending in the z direction. The worm wheel 52 and the output shaft 3 are integrally formed, for example, by insert molding the worm wheel 52 made from metal material with the output shaft 3 made with resin material.

When the motor 4 is driven to rotate by the reduction mechanism 5, the driving force of the motor 4 is transmitted from the worm 51 to the worm wheel 52, and the output shaft 3 rotates.

A bearing 23 is provided on the inner wall of the upper case 21, at which one end 31 of the output shaft 3 is supported in the z positive direction side. Meanwhile, an opening 24 is provided in the lower case 22, and the other end 32 of the output shaft 3 is exposed to the outside of the housing 2 from the opening 24 on the z negative direction side. The connecting member 103 described above is connected to the other end 32 of the output shaft 3.

The motor 4 is provided between the upper case 21 and the lower case 22 and is held so as to be interposed between the upper case 21 and the lower case 22. The worm 51 that engages the worm wheel 52 is provided at the end of the drive shaft of the motor 4. The motor 4 is rotated by a control device (e.g., an ECU of vehicle) provided externally to rotate the worm wheel 52 engaging the worm 51 and the output shaft 3.

The tachometer side portion 6 measures the rotation amount of the output shaft 3. The rotation amount of rotation includes at least one of the number of rotations, the angle of rotation, and the speed of rotation. The tachometer side portion 6 includes a magnet 61 provided to rotate integrally with the output shaft 3 and a Hall effect IC (a Hall element) 62 disposed oppositely outside the rotation locus of the magnet 61. The magnet 61 is configured such that the N and S poles are alternately arranged along the rotation direction of the output shaft 3. The Hall effect IC 62 is an alternating detection type Hall effect IC, in which the output voltage changes by detecting a change in polarity of the magnetic flux density (magnetic field applied to the IC by the magnet 61). The tachometer side portion 6 can measure the rotation amount of the output shaft 3 based on the detected value of the Hall effect IC 62. The number of Hall effect ICs 62 is not limited to the structure of having one Hall effect IC 62 as illustrated in FIG. 2 but may be two or more. In this case, each Hall effect IC 62 is disposed along a circumferential wall 25 in a cylindrical shape.

Referring also to FIGS. 3 to 6, the structure of the tachometer side portion 6 will be described.

Figure 3:
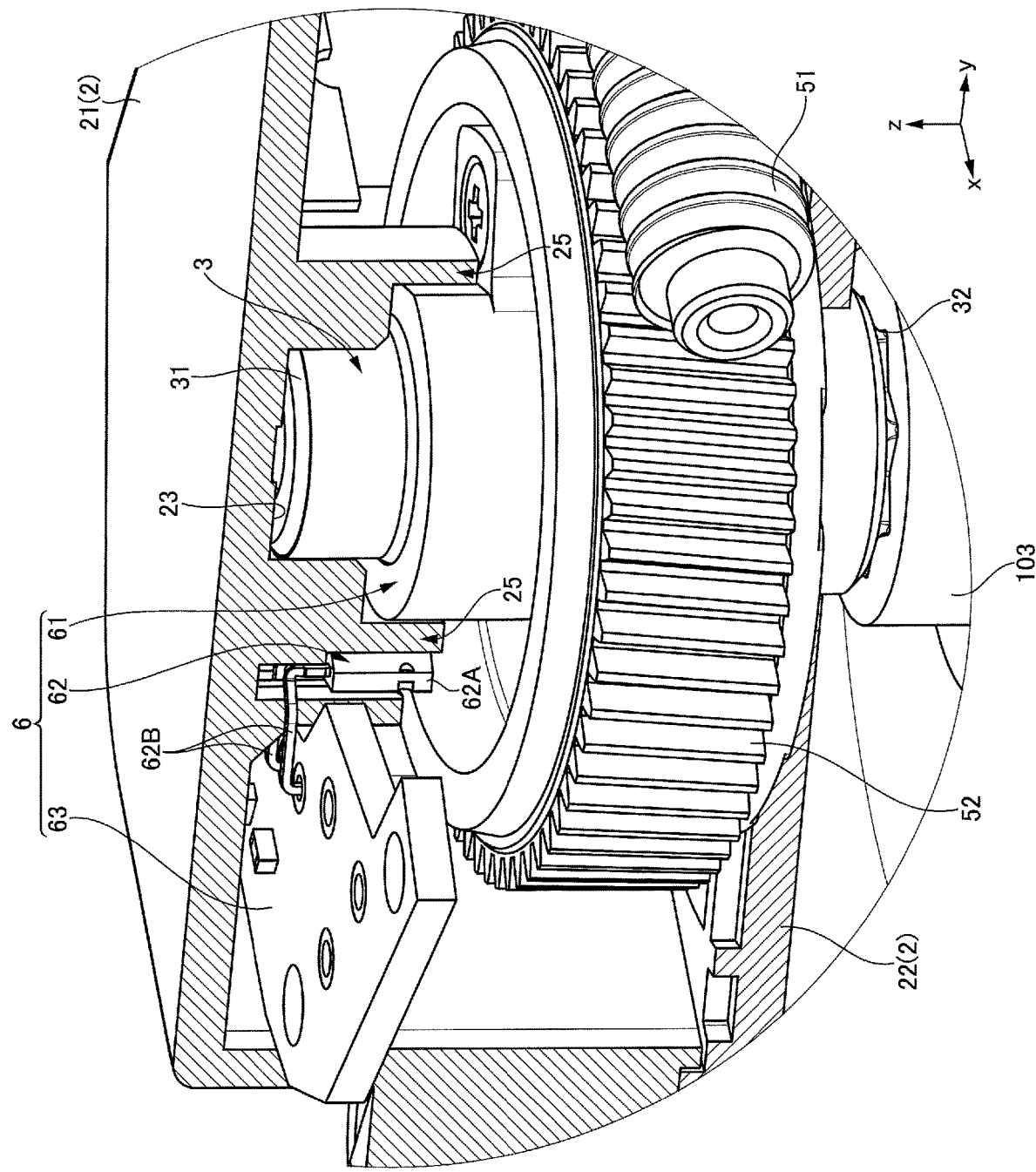
FIG. 3 is an enlarged perspective view of a side portion of the tachometer in FIG. 1.
Figure 4:
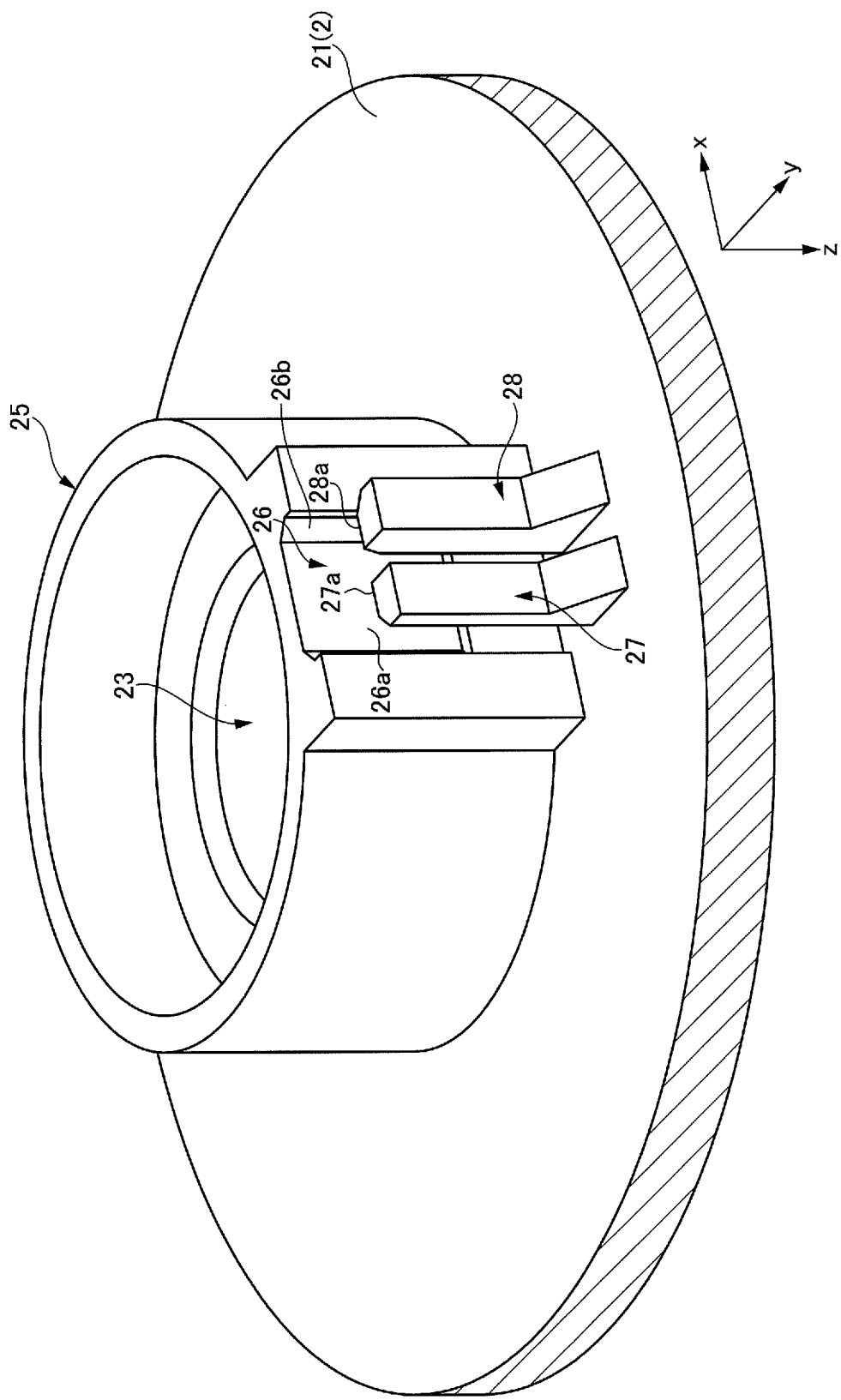
FIG. 4 is perspective view illustrating the structure of a bearing of an output shaft.
Figure 5:
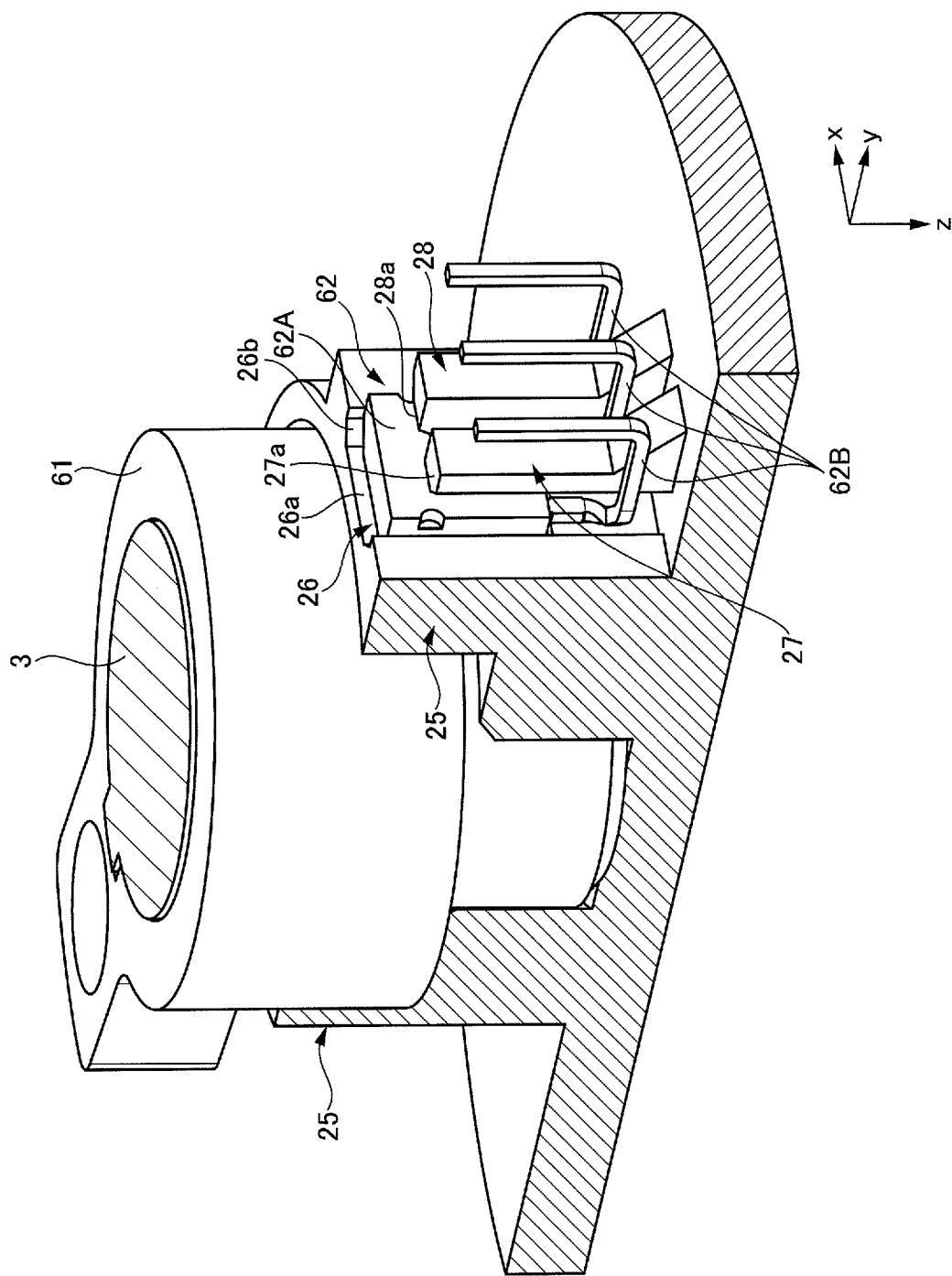
FIG. 5 is a partial cross-sectional view with enlarged view in which vicinities of a bearing and tachometer are enlarged and a substrate is not present.
Figure 6:
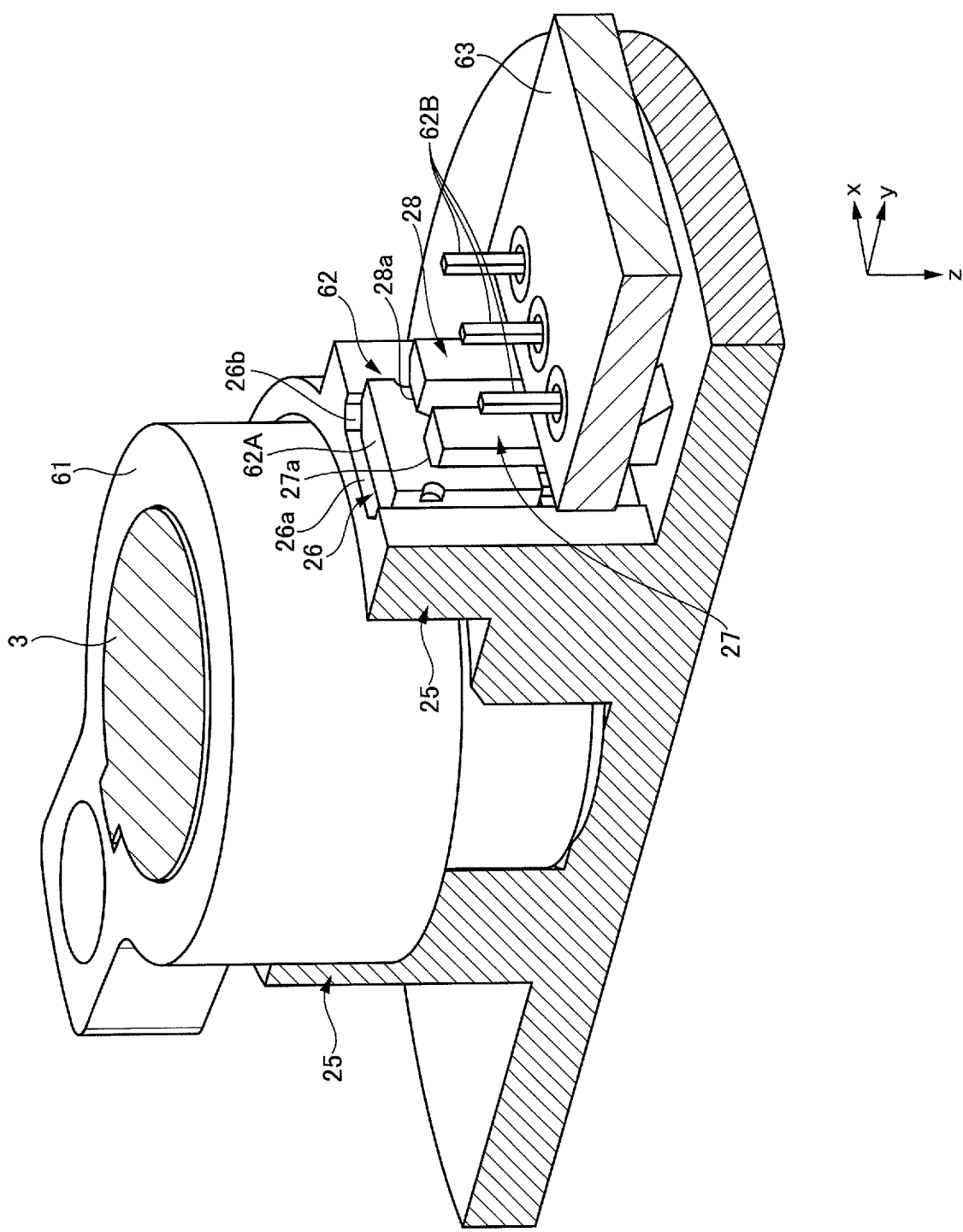
FIG. 6 is a partial cross-sectional view with enlarged view in which vicinities of a bearing and tachometer are enlarged and a substrate is mounted.

FIG. 3 is a perspective view illustrating an enlarged view of the vicinity of the tachometer side portion 6 in FIG. 1. FIG. 4 is a perspective view illustrating the structure of the bearing 23 of the output shaft 3. FIG. 5 is a partial cross-sectional view illustrating an enlarged view of the vicinity of the bearing 23 and the tachometer side portion 6 in a state of omitting the substrate. FIG. 6 is a partial cross-sectional view illustrating an enlarged view of the vicinity of the bearing 23 and the tachometer side portion 6 in a state of installing the substrate.

As illustrated in FIG. 2, the magnet 61 is generally in a cylindrical shape along the outer periphery of the output shaft 3. The inside diameter of the magnet 61 is substantially the same as the diameter of the output shaft 3 and is formed so as to penetrate through the output shaft 3. The outer diameter of the magnet 61 is smaller than the diameter of the worm wheel 52. The magnet 61 is disposed at a position between the output shaft 3 and the worm wheel 52 in the radial direction. The magnet 61 is fixed to the supporting portion of the worm wheel 52 to the output shaft 3 while the output shaft 3 penetrates the magnet 3, as illustrated in FIGS. 2 and 3, for example, by means of securing the screws.

The magnet 61 is attached to the side of the bearing 23 from the supporting portion of the worm wheel 52 of the output shaft 3. The bearing 23 is installed to stand axially from the inner wall of the upper case 21. As illustrated in FIGS. 2 to 6, the circumferential wall 25 along the circumference stands on the outer peripheral side of the bearing 23 from the bearing 23 to the inner side of the housing 2. The circumferential wall 25 has an inner diameter substantially the same as the outer diameter of the magnet 61 and is formed so as to be enabled to engage the magnet 61.

As illustrated in FIGS. 4 to 6, the outer peripheral surface of the circumferential wall 25 is provided with an accommodating portion 26 with which the Hall effect IC 62 is engaged. The accommodating portion 26 is formed to be recessed toward the center side in the radial direction from the outer peripheral surface of the circumferential wall 25.

In addition, two pillars 27 and 28, which stand from the inner wall of the upper case 21 of the housing 2, are provided at a position facing the accommodating portion 26 on the outside in the radial direction from the circumferential wall 25. The Hall effect IC 62 has a main body portion 62A and three feet 62B extending in the same direction from the main body portion 62A. The main body portion 62A of the Hall effect IC 62 is accommodated in the accommodating portion 26 and the three feet 62B of the Hall effect IC 62 are respectively arranged at positions between the two pillars 27 and 28 and on both sides thereof.

As illustrated in FIG. 5, the Hall effect IC 62 is installed in the accommodating portion 26 so that the feet 62B direct the inner wall side of the housing 2. The feet 62B bend generally at right angles along the inner wall and further bends generally at right angles along the axial direction from the inner wall. As illustrated in FIG. 6, the bent portions of the feet 62B are attached to the substrate 63 from the inner wall side (z negative direction side). When the conventional Hall effect IC 62 is installed around the magnet 61, it is generally considered that, in contrast to the arrangement of FIGS. 5 and 6, the main body portion 62A faces the inner wall side from the feet 62B and mounts the substrate 63 to the feet 62B that extends linearly from the main body portion 62A to the inner space side of the housing 2 so as to facilitate assembling. On the other hand, in the mode of installing the Hall effect IC 62 according to the present embodiment, the feet 62B are disposed on the inner wall side of the main body portion 62A. Therefore, the protrusion amounts of the feet 62B toward the inner side of the housing 2 can be suppressed. In addition, since the measurement-related elements (such as the substrate 63) can be disposed close to the wall surface, the internal space of the housing 2 can be made larger.

The feet 62B of the Hall effect IC 62 are electrically connected to a terminal 64 also connected to the substrate 63, as illustrated in FIG. 2. These three terminals 64 protrude outwardly from the housing 2. By electrically connecting these terminals 64 to a control device such as an on-board ECU, the measured value of the Hall effect IC 62 can be obtained to derive the rotational amount of the output shaft 3. The control device can also control the drive of the motor 4 to bring the exhaust valve 101 to a predetermined opening degree based on the rotational amount of the output shaft 3.

Hereinafter, an effect of the present embodiment will be described. The tachometer side portion 6 uses the Hall effect IC 62. The position of the magnet 61 relative to the Hall effect IC 62 of the so-called alternating detection type, which is the rotation amount of the output shaft 3, is measured based on the output value of the Hall effect IC 62, which varies according to a change in the magnetic flux density of the magnet 61. Therefore, if an iron-based foreign material enters between the Hall effect IC 62 and the magnet 61, the output voltage from the Hall effect IC 62 becomes abnormal, and the measurement accuracy may be deteriorated.

In response to such a problem, the circumferential wall 25 is provided between the magnet 61 and the Hall effect IC 62. Because this structure allows the space between the magnet 61 and the Hall effect IC 62 to be filled with the circumferential wall 25 to prevent foreign material from entering, it is possible to prevent the measurement accuracy from being deteriorated. As a result, the actuator 1 according to the present embodiment can maintain highly accurate detection of the rotational amount.

Because the circumferential wall 25 is formed from the inner wall of the upper case 21 of the housing 2 so as to stand, it can be manufactured as a part of the upper case 21. As a result, assembling easiness can be maintained without increasing the number of parts.

The radial thickness of the circumferential wall 25 is, for example, 0.8 to 1.5 mm, preferably 1.2 to 1.5 mm. Therefore, the distance between the magnet 61 and the Hall effect IC 62 can be constant, and the measurement accuracy can be stabilized.

In this embodiment, the magnet 61 and the Hall effect IC 62 constituting the tachometer side portion 6 are disposed between the circumferential wall 25 standing from the inner wall of the upper case 21 of the housing 2. In other words, the tachometer side portion 6 is disposed inside the housing 2. Therefore, it is not necessary to install the tachometer side portion 6 outside of the actuator 1, so that the size of the actuator 1 can be reduced. As described with reference to FIG. 1, the actuator 1 of the present embodiment is mainly used to drive the exhaust valve 101 in the exhaust valve driving device 100. Because the actuator 1 is installed around the engine exhaust passage 110, it is preferable that the actuator 1 be as small as possible in consideration of the engine room space. Accordingly, because the actuator 1 can be downsized according to the structure according to the present embodiment, the freedom and easiness of arrangement can be improved when the actuator 1 is applied to the exhaust valve driving device 100.

In this embodiment, because the circumferential wall 25 is a cylindrical wall having a shape like concentric circles with the output shaft 3 or the rotation locus of the magnet 61, it is easy to form integrally with the inner wall of the upper case 21 of the housing 2, and easiness of manufacturing the actuator can be improved.

In this embodiment, the main body portion 62A of the Hall effect IC 62 is accommodated in the accommodating portion 26 formed to recess onto the side of the rotation center 26 from the outer peripheral surface of the circumferential wall 25 to the rotation center side of the magnet 61, so that the movement of the Hall effect IC 62 in the peripheral direction can be regulated by the side surface 26b in both sides in the peripheral direction 26b of the accommodating portion 26, and the movement of the Hall effect IC 62 in the radial direction can be regulated by the bottom surface 26a of the accommodating portion 26 in the radial direction 26a. This further improves the measurement accuracy of the magnetic field by the Hall effect IC 62 and facilitates positioning of the Hall effect IC 62.

In this embodiment, the three feet 62B of the Hall effect IC 62 are installed while the middle one of the three feet 62B passes between the two pillars 27 and 28 which stand from the inner wall of the housing 2 at a position facing the accommodating portion 26 on the outer side in the radial direction of the circumferential wall 25. Therefore, the positioning of the feet 62B can be facilitated and the assembly of the Hall effect IC can be made easier. It is preferable that the distance between the surfaces 27a and 28a on the central side of the two pillars 27 and 28 and the bottom surface 26a of the accommodating portion 26 in the radial direction is substantially equivalent to the thickness of the main body portion 62A of the Hall effect IC 62. This arrangement of the two pillars 27 and 28 further regulates the movement of the Hall effect IC 62 on the outer side in the radial direction so as to further improve the measurement accuracy by the Hall effect IC 62.

As described above, this embodiment has been described with reference to the specific examples. However, the present disclosure is not limited to these specific examples. These specific examples, to which the design has been appropriately modified by those skilled in the art, are also included in the present disclosure as long as they possess the features of the present disclosure. The elements provided in each of the specific examples described above, and the arrangement, condition, shape, and the like thereof, may be appropriately modified without being limited to those exemplified. Each element provided by each of the above-described specific examples may vary in combination as appropriate, unless there is a technical inconsistency.

In the above-described embodiment, the circumferential wall 25 is the cylindrical wall like concentric circles with the rotation locus of the magnet 61, but the circumferential wall 25 may have a shape other than the cylindrical shape if the circumferential wall 25 can interpose between the magnet 61 and the Hall effect IC 62. For example, the shape may be such that a cylinder is partially scraped. Although the shape may be elliptical or flat, it is particularly preferred to have a curved surface like concentric circles around the rotation center of the magnet 61. This is because the measurement accuracy can be stabilized by maintaining a constant distance between the magnet 61 and the Hall effect IC 62 regardless of the rotation of the magnet 61.

Further, it may be structured that the accommodating portion 26 or the pillars 27 and 28 for installing the Hall effect IC 62 are omitted. A Hall element other than the Hall effect IC 62 may be used.

In the above-described embodiment, the structure having the worm 51 and the worm wheel 52 as the structure of the reduction mechanism 5 is illustrated. However, another structure may be used if the motor 4 and the output shaft 3 can be connected to provide power transmission.

DESCRIPTION OF SYMBOLS

1 Actuator
2 Housing
3 Output shaft
4 Motor (drive source)
5 Reduction mechanism
6 Tachometer side portion
61 Magnet
62 Hall effect IC (Hall element)
25 Circumferential wall
26 Accommodating portion
27, 28 Pillar
100 Exhaust valve driving device
101 Exhaust valve

What is claimed is:

1. An actuator comprising:
    a housing;
    an output shaft, which is provided to protrude from an inside of the housing to an outside of the housing;
    a power source, which is provided inside the housing;
    a reduction mechanism, with which the power source and the output shaft are connected;
    a magnet, which is provided inside the housing so as to rotate integrally with the output shaft;
    a Hall element, which is disposed to face the magnet on an outside of a rotation locus of the magnet;
    a circumferential wall, which is disposed to stand from an inner wall of the housing and is interposed between the magnet and the Hall element;
    an accommodating portion, which is formed from an outer peripheral surface of the circumferential wall to a rotation center side of the magnet and accommodates the Hall element; and
    two pillars provided to stand from the inner wall of the housing at a position facing the accommodating portion on an outer side in a radial direction of the an outer side in a radial direction of the circumferential wall,
    wherein the Hall element has a main body portion and three feet extending in a same direction from the main body portion, and
    the main body portion of the Hall element is accommodated in the accommodating portion and only a middle foot among the three feet of the Hall element passes between the two pillars and the other two feet among the three feet of the Hall element are respectively situated on outer sides of the two pillars.

2. The actuator according to claim 1,
    wherein the circumferential wall is a cylindrical wall which is like a concentric circle with the rotation locus of the magnet.

3. An exhaust valve driving device system comprising:
    the actuator according to claim the actuator according to claim 1; and
    an exhaust valve, which is connected to the output shaft and provided in an exhaust passage of an internal combustion engine.

* * * * *